United States Patent

Doi et al.

[15] 3,681,521
[45] Aug. 1, 1972

[54] COLOR TELEVISION CAMERA WITH DICHROIC MIRRORS

[72] Inventors: Yoshikazu Doi; Toshiro Kishikawa, both of Ohmiya-shi; Hiroshi Nomura, Tokyo, all of Japan

[73] Assignees: Fuji Shashin Kabushiki Kaisha, Ohmiya-shi, Saitama-ken; Nippon Television Hosomo Kabushiki Kaisha, Tokyo, Japan

[22] Filed: Jan. 21, 1969

[21] Appl. No.: 792,264

[30] Foreign Application Priority Data

Jan. 30, 1968 Japan..............................43/5609

[52] U.S. Cl.................................178/5.4 E, 350/171
[51] Int. Cl.................................................H04n 9/08
[58] Field of Search............350/169, 171, 172, 173; 352/41, 42, 66, 67; 178/5.4 E, 5.4 TC

[56] References Cited

UNITED STATES PATENTS

| 2,829,195 | 4/1958 | Goldmark | 178/5.4 O |
| 3,515,460 | 6/1970 | Baluteau et al. | 178/5.4 O |
| 3,521,944 | 7/1970 | Kishikawa | 350/173 |

FOREIGN PATENTS OR APPLICATIONS

| 1,168,763 | 4/1964 | Germany | 178/5.4 TC |

*Primary Examiner*—Robert L. Griffin
*Assistant Examiner*—George G. Stellar
*Attorney*—Ralph E. Burcknam, Jesse D. Reingold, Robert R. Strack and Henry A. Marzullo, Jr.

[57] ABSTRACT

A color television camera having a photographic lens, dichroic mirror means for separating a light passing through said photographic lens into a plurality of chromatic rays and image pickup tubes for receiving said respective chromatic rays, said color television camera comprising means for deflecting in one plane a main light path which is not reflected by said dechroic mirror means and relay lens means having at least part thereof arranged adjacent said deflecting means, said dichroic mirror means inclusing at least two dichroic mirrors each arranged forwardly and rearwardly of said deflecting means and said relay lens means, one of said dichroic mirrors being positioned so as to lead one of said chromatic rays along a side light path parallel to said main light path and outside a plane in which said main light path lies, another one of said dichroic mirrors being positioned so as to lead another one of said chromatic rays along a side light path parallel to said main light path and lying in said plane, and the image-forming surfaces of said image pickup tubes being located substantially in the same plane.

3 Claims, 11 Drawing Figures

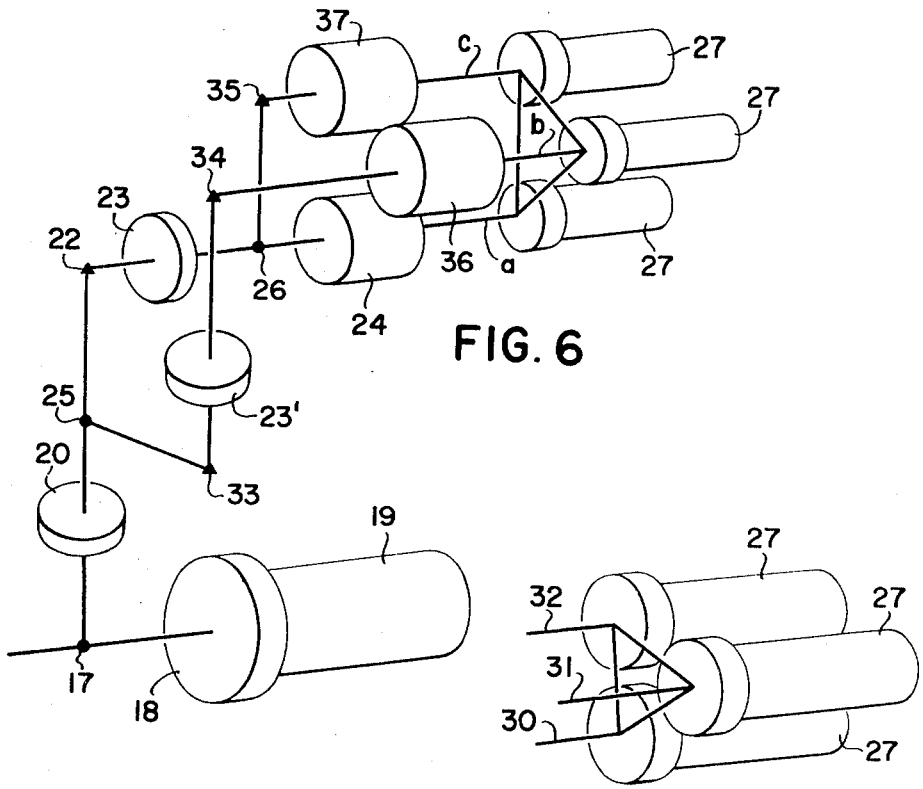
FIG. 6
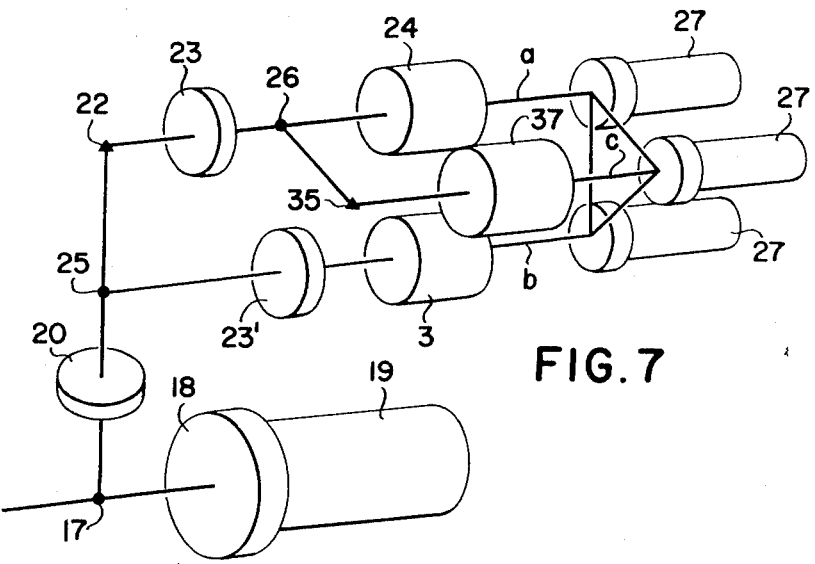
FIG. 5
FIG. 7

COLOR TELEVISION CAMERA WITH DICHROIC MIRRORS

BACKGROUND OF THE INVENTION

The present invention relates to a color television camera.

In a color television camera, a light passing through a photographic lens is generally separated into three colors by means of dichroic mirrors after passing through a relay lens and the rays of the respective colors are led into respective image pickup tubes. Conventional color television cameras have been bulky as a whole due to the arrangement of the light paths extending from the photographic lens to the image pickup tubes, and therefore inconvenient in handling.

SUMMARY OF THE INVENTION

The present invention contemplates the provision of a color television camera which is small in size and compact in form compared with the conventional color television cameras.

According to the invention, there is provided a color television camera having a photographic lens, dichroic mirror means for separating a light passing through said photographic lens into a plurality of chromatic rays and impage pickup tubes for receiving said respective chromatic rays, said color television camera comprising means for deflecting in one plane a main light path which is not reflected by said dichroic mirror means and relay lens means having at least part thereof arranged adjacent said deflecting means, said dichroic mirror means including at least two dichroic mirrors each arranged forwardly and rearwardly of said deflecting means and said relay lens means, one of said dichroic mirrors being position so as to lead one of said chromatic rays along a side light path parallel to said main light path and outside a plane in which said main light path lies, another one of said dichroic mirrors being positioned so as to lead another one of said chromatic rays along a side light path parallel to said main light path and lying said plane, and image-forming surfaces of said image pickup tubes being located substantially in the same plane.

The main light path and the side light paths are preferably located so as to pass the respective apices of a regular polygon having a number of sides equal to the number of these light paths. Namely, the light paths are located so as to pass the apices of an equilateral triangle respectively where a light passing through the photographic lens is separated into three chromatic rays. According to the invention, a color television camera can be constructed in very small size and compact form compared with the conventional ones.

BRIEF DESCRIPTION OF THE DRAWINGS

FIG. 5 is a perspective view showing diagrammatically an embodiment of the image pickup tube arrangement according to the present invention;

FIGS. 6 and 7 are perspective views showing diagrammatically embodiments of the optical system of this invention;

DESCRIPTION OF THE PREFERRED EMBODIMENTS

Figure 1:
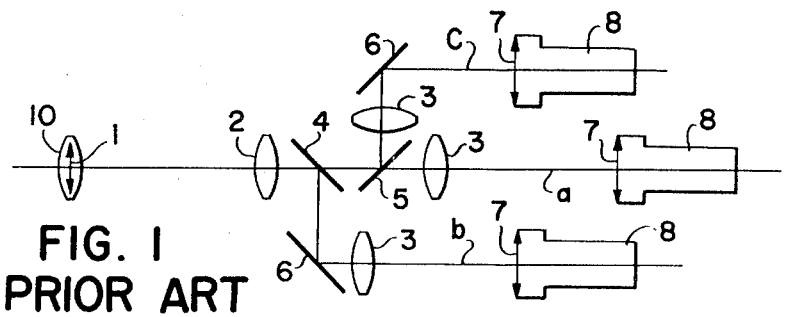
FIG. 1 is a schematic diagram showing the optical system of a conventional color television.
Figure 2:
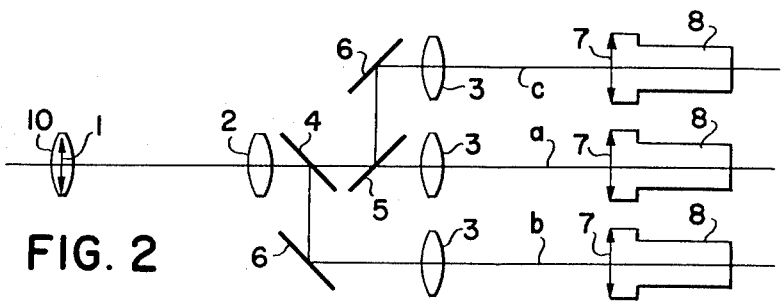
FIG. 2 is a diagram showing an arrangement wherein the image-forming planes of respective image pickup tubes are located in the same vertical plane.

Referring to FIG. 1 in which is shown the arrangement of the optical system employed in a conventional color television, reference numeral 1 designates an image-forming plane in which a field lens 10 is located, and reference numerals 2 and 3 designate relay lenses between which a flux of light is usually parallel. Reference numerals 4 and 5 designate dichroic mirrors to decompose a light into three colors, 6 reflectors and 7 final image-forming planes, that is, the photoelectric surfaces of image pickup tubes 8. The dichroic mirror 4 reflects only part of the light, e.g. blue color, thereon, while allowing the remaining part to pass therethrough, whereas the dichroic mirror 5 reflects only the other part of the light, e.g. red color, while allowing the remaining part, i.e. green color, to pass therethrough, whereby the light is separated into three colors. In this case, the light path of a color which is not reflected on the dichroic mirrors 4, 5, i.e. the straight light pass in the diagram, is referred to as main light path a, and the other two light paths, i.e. the light paths of the colors reflected on the dichroic mirrors 4, 5, as side paths b and c. According to the arrangement shown, the lengths of the light paths between the forward relay lens 2 and the respective backward relay lenses 3 along the optical axes of said respective lenses are substantially the same and, therefore, the horizontal positions of the three image pickup tubes 8 are largely staggered. Namely, the image-forming planes of the image pickup tubes are not located in the same plane. FIG. 2 shows an arrangement in which the three image pickup tubes 8 are arranged in the same positions horizontally so as to locate the image-forming planes thereof in the same plane. In this case, the distances between the forward relay lens 2 and the backward relay lenses 3 in the respective light paths are not equal to each other, so that it becomes necessary to either make the flux of light between said lenses completely parallel or differentiate the focal distances of the relay lenses 3 in the respective light paths.

In addition, according to the arrangement shown in FIG. 2 it is difficult to obtain a bright image on the image-forming plane or the photoelectric surface 7 of each image pickup tube 8. This is because the lengths of the light paths between the forward relay lens 2 and the backward relay lenses 3 located in the side light paths are so long that compensation of aberration becomes difficult and further the quantity of peripheral light is reduced substantially. Alternatively, the forward lens 2 may be eliminated and all lenses may be concentrated at the positions of the backward relay lenses 3, but this method has the disadvantage that the lenses used must be extremely large in diameter for obtaining bright images, with the accompanying result that the lenses collide against each other.

Figure 3:
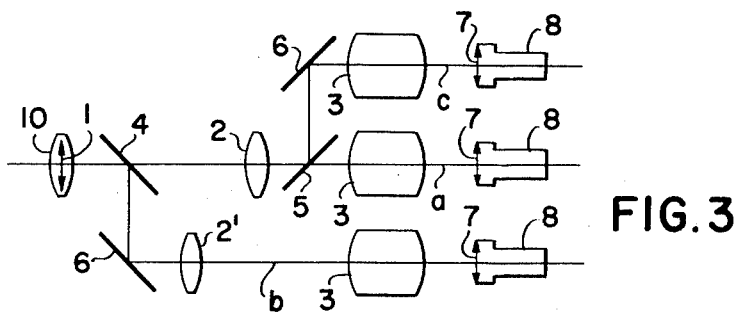
FIG. 3 is a diagram showing the arrangement of FIG. 2 modified so as to obtain more bright images.

Now, in order to locate the three image pickup tubes 8 in the same horizontal positions and yet to obtain bright images, the arrangement shown in FIG. 3 may be considered. Namely, the lenses are segregated into forward relay lens 2 and backward relay lenses 3, and the dichroic mirrors 4, 5 are located forwardly and rearwardly of the forward relay lens 2 respectively. This arrangement enables the distance between the relay lenses 2 and 3 to be much shortened compared with the arrangement of FIG. 2, as color separation is required only once between the relay lenses 2 and 3, and therefore advantageous from the standpoint of compensation of aberration as well as the quantity of peripheral light. It is of course possible to use lenses of complicate structure for the backward relay lenses 3 for obtaining bright images. In the side light path $b$ of the light which is reflected on the dichroic mirror 4, located forwardly of the forward relay lens 2, are provided relay lenses 2' and 3.

Figure 4:
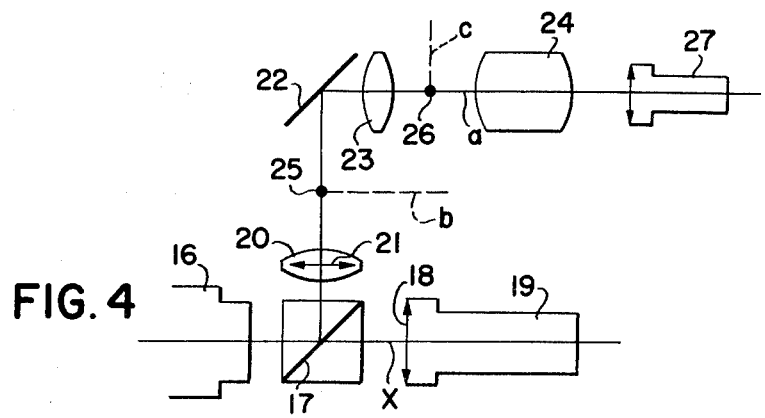
FIG. 4 is a diagram showing an arrangement wherein a main light path is deflected.

In the arrangement shown in FIGS. 1 to 3 inclusive, the main light path $a$ is a straight line. Therefore, the distance from a lens 10 to the image pickup tube 8 is considerably long, which gives a large influence on the size of the entire camera. It will, therefore, be seen that the size of the entire camera can be made small by deflecting the main light path $a$ in an L-shape as shown in FIG. 4. In FIG. 4 (in which is shown the main light path $a$ only and the side light paths $b$, $c$ are omitted), reference numeral 16 designates a photographic lens and 17 designates a beam-splitting film coated on the surface of a prism or mirror and adapted to separate the light into luminance channel $x$ and chrominance channel $y$. Reference numeral 18 designates the photoelectric surface of an image pickup tube 19 in the luminance channel, on which the photographic lens 16 directly forms an image. If a camera is desired in which the luminance channel $x$ is not required but the chrominance channel $y$ only is desired, such camera can be obtained by forming a total reflection film on the prism or mirror, instead of the beam-splitting film 17, and eliminating the image pickup tube 19. Reference numeral 21 designates an image-forming plane of the photographic lens 16 conjugate with the image pickup tube 19 and a field lens 20 is located in this position. The main light path $a$ extends upwardly from the beam-splitting film 17 and is reflected perpendicularly rearwardly on a reflector 22. Obviously, the reflector 22 may be replaced by a prism. A forward relay lens 23 is located adjacent the reflector 22 as close to said reflector as possible, and a relay lens 24 and an image pickup tube 27 are positioned rearwardly of said forward relay lens. Dichroic mirrors 25, 26 to form respective side light paths $b$, $c$ are placed forwardly and rearwardly of the forward relay lens 23. In order to reduce the entire length of the camera by effectively utilizing the space, it is necessary to locate the dichroic mirror 25, not between the reflector 22 and the lens 23 but forwardly of the reflector 22. In other words, the dichroic mirrors 25, 26 should be placed on both sides of a group consisting of the reflector 22 and the forward relay lens 23.

It is obvious that the entire size of a color television camera is largely influenced by the relative positions and figures of the three image pickup tubes in the chrominance channel $y$. Namely, the size of the camera would become large if the three image pickup tubes are located remote from each other at random or with the axes thereof extending in different directions. The arrangement of FIG. 5 is believed to be one in which the three image pickup tubes are arranged most compactly spacewise. In FIG. 5, as seen, the axes 30, 31 and 32 of the three image pickup tubes 27 are parallel to each other and pass the apices of an equilateral or approximately equilateral triangle in a plane perpendicular thereto respectively. Furthermore, the photoelectric surfaces of the respective image pickup tubes are substantially on the same plane. Needless to say, the entire arrangement becomes more compact as the lengths of the sides of the triangular, that is, the distance between the axes of the image pickup tubes, becomes shorter. If it is possible electrically to arrange the image pickup tubes 27 in the manner described for forming optical impages on the photoelectric surfaces of the respective tubes and shortening the entire length of the optical system, a color television camera of extremely small size could be obtained.

It has already been described that the arrangements of FIGS. 3 and 4 enable an optical system to be obtained which is short in its entire length and capable of forming bright images. In order to take out further two side light paths $b$, $c$ from the main light path $a$ shown in FIG. 4 and also to form the final images on the photoelectric surfaces of the respective three image pickup tubes arranged triangularly as shown in FIG. 5, it is only necessary that at least one of the two side light paths $b$, $c$, taken out from the dichroic mirrors 25, 26 in FIG. 4, is not included in a plane in which the L-shaped main light path $a$ lies. Such an arrangement will be described practically with reference to FIGS. 6 and 7 hereunder:

In FIG. 6, similar numerals indicate similar parts to those shown in FIGS. 4 and 5, and furthermore the dichroic mirrors and the reflectors are indicated by black dots at the deflection points of the respective light paths for the sake of simplicity. The main path $a$ shown in FIG. 4 passes, in FIG. 6, through the field lens 20, the reflector 22, the forward relay lens 23 and the backward relay lens 24, and reaches the image pickup tube 27. The dichroic mirrors 25, 26 are located forwardly and rearwardly of the forward relay lens 23 respectively. The side light path $b$ reflecting on the dichroic mirror 25 passes through another reflector 33 and a relay lens 23', while the other side light path $c$ is reflecting on the dichroic mirror 26. Then, the side light paths $b$, $c$ are deflected to be parallel to the main light path $a$ upon reflecting on respective reflectors 34, 35 and after passing through backward relay lenses 36, 37, enter the respective image pickup tubes 27 which are arranged in a triangular shape with the opposite ends thereof located on the same planes respectively. Namely, according to this arrangement the side light path $c$ lies in a plane including the main light path $a$ but the other wide light path $b$ does not lie in said plane.

With the arrangement described above, the final images can be formed on the photoelectric surfaces of the respective triangularly arranged image pickup tubes 27 and these final images formed from the three light paths are located in substantially the same positions horizontally as will be apparent from the fact that the arrangement of this optical system is a modification of that shown in FIG. 3. It is to be noted that the angle defined by a plane including the side light path b and the plane including the L-shaped main light path a can be changed freely by the lengths of the respective light paths and depending upon the space which is available.

Final image-forming planes, similar to those in FIG. 6, may also be obtained by the arrangement shown in FIG. 7 in which the side light path b, taken out from the dichroic mirror 25, is included in a plane in which the main light path a lies and the side light path c, taken out from the dichroic mirror 26, is not included in said plane.

As will be clearly understood from the foregoing description, in order to obtain bright optical images on the photoelectric surfaces of the image pickup tubes 27, arranged in the way shown in FIG. 5, by an optical system which is short in horizontal length, it is necessary to deflect the main light path a in an L-shape, to locate part of the relay lens system as close to the deflection point of said main light path as possible and to locate the dichroic mirrors on both sides of the group consisting of the reflector and the lens, each forwardly and rearwardly of said group, and further, it is necessary to locate at least one of the two side light paths b, c , extending from the respective dichroic mirrors, outside of a plane in which the L-shaped main light path lies.

According to the arrangement described above, a proper optical system can be designed even when the distance between the axes of the triangularly arranged image pickup tubes is reduced considerably. Practically speaking, with 25 mm. vidicons arranged in such a compact form that the axes thereof define an equilateral triangle of 35 mm. side, an optical system can be obtained which is suitably used in a super-miniature color television camera on the order of 160 mm. in the overall longitudinal length comprising F2 lens as image-forming lens.

Figure 8:
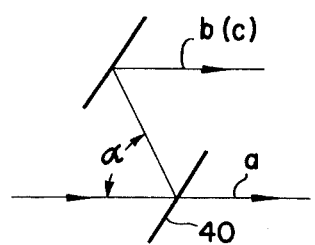
FIGS. 8 and 9 are front views showing other embodiments of the optical system.
Figure 9:
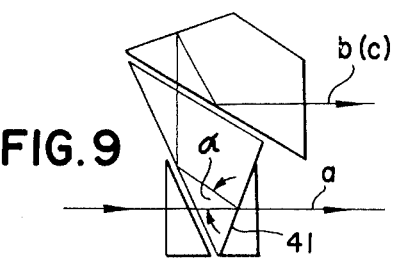

In the illustration of FIGS. 6 and 7, the light is reflected on the dichroic mirror at an angle of 90° to the direction of incidence. In practice, however, such a condition tends to result in the so-called color shading which makes it impossible to obtain a satisfactory chromatic effect. It is for this reason that the color separation as shown in FIGS. 8 and 9 becomes necessary. Namely, FIG. 8 exemplifies a method of minimizing the color shading by making the angle $\alpha$, defined by the incident light axis and the reflecting light axis, as small as possible upon suitably changing the angle of inclination of a dichoric mirror 40. FIG. 9 exemplifies a method of making the angle $\alpha$ further smaller by changing the angle of inclination of a dichoric film 41 by means of prisms. These methods of color separation as shown in FIGS. 8 and 9 can be incorporated in the optical system of this invention with no detrimental effect at all and will not make it difficult to practice the present invention. It is also to be noted that a satisfactory optical system can be obtained according to the present invention by arranging more than three image pickup tubes in such a manner that the photoelectric surfaces of the respective tubes are located in the same plane and the axes thereof are parallel to each other and define a polygon in a plane perpendicular thereto.

Figure 10:
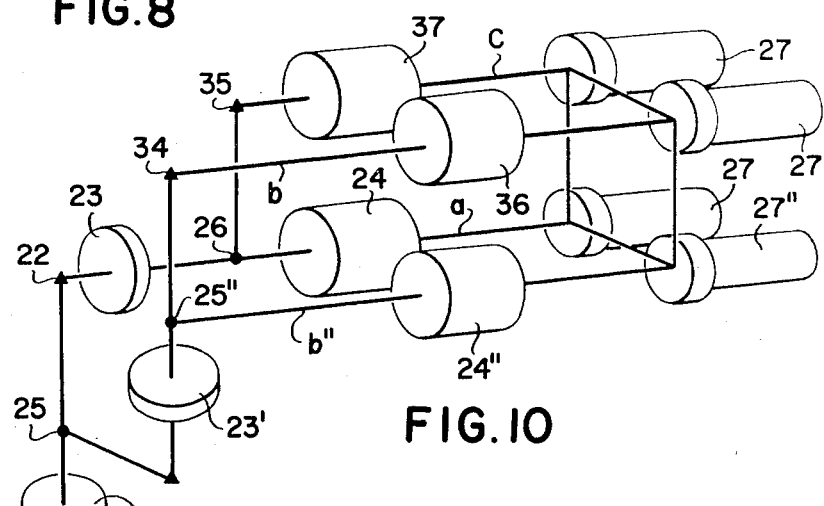
FIGS. 10 and 11 are perspective views showing diagrammatically still other embodiments of the optical system wherein four image pickup tubes are used.
Figure 11:
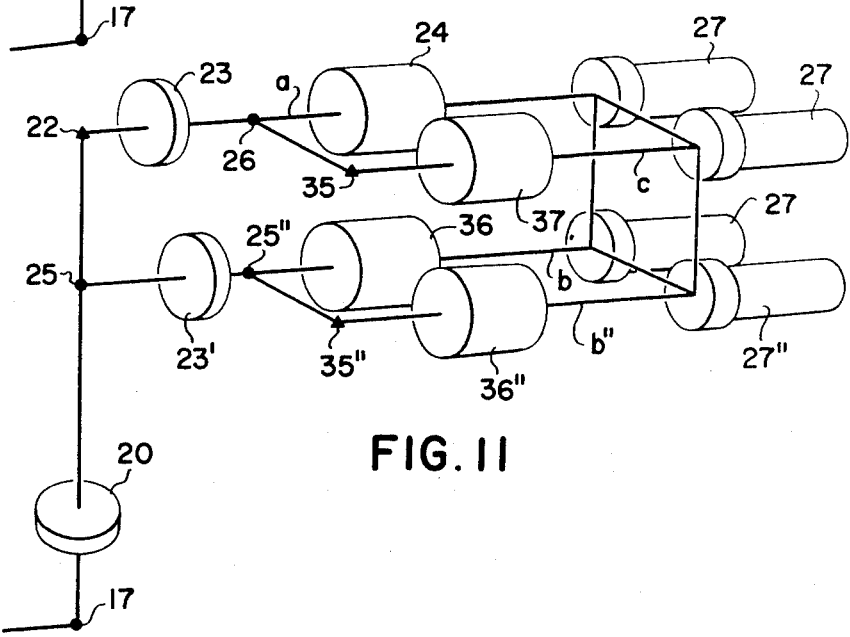

As an example, FIGS. 10 and 11 shows an optical system in which four image pickup tubes are arranged with the axes thereof defining a square in a plane perpendicular thereto. As may be understood, the optical system of FIG. 10 is a modification of FIG. 6 and the optical system of FIG. 11 is a modification of FIG. 7. Descriptions on these optical systems are omitted by indicating similar parts by similar numerals and additional side light paths by reference character $b''$.

We claim:

1. A color television camera comprising a photographic lens through which a main light beam passes, a first dichroic mirror means disposed after said photographic lens for separating and reflecting a first component of the said main light beam while allowing the remaining part to pass therethrough and continue along a first portion of a main light path, deflecting means disposed after said first dichroic mirror means in said first portion of said main light path and deflecting said remaining part of said main light beam along a second portion of said main light path, said first and second portions of said main light path being substantially perpendicular to one another and defining a first plane, relay lens means disposed after said deflecting means in said second portion of said main light path, second dichroic mirror means disposed after said relay lens means in said second portion of said main light path for separating and deflecting a second component of said main light beam while allowing the remaining part to pass therethrough along said second portion of said main light path, a second deflector means, one of said first or second dichroic mirror means being arranged to deflect its component of said main light beam to said second deflector means so that the latter means deflects the last said component along a light path within the said first plane, a third deflector means, the other of said first or second dichroic mirror means being arranged to deflect its component of said main light beam to said third deflector means so that the latter means deflects the last said component along a side light path located in a plane spaced from and parallel to said first plane, and relay lens means followed by pick-up tube means for receiving said remaining part of said main light beam and for receiving each of said separated components, said image-forming surfaces of said image pick-up tube means being located substantially in the same plane.

2. A color television camera as defined in claim 1, in which said main light path and said light paths of said components are arranged so as to pass the respective apices of a regular polygon having a number of sides equal to the number of said light paths.

3. A color television camera as defined in claim 2 wherein said polygon is an equilateral triangle.

* * * * *